UNITED STATES PATENT OFFICE.

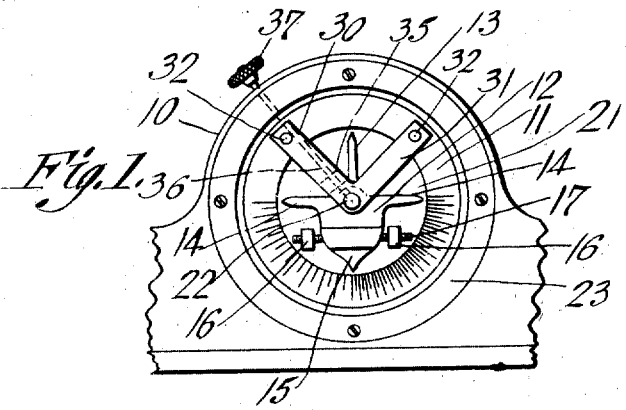
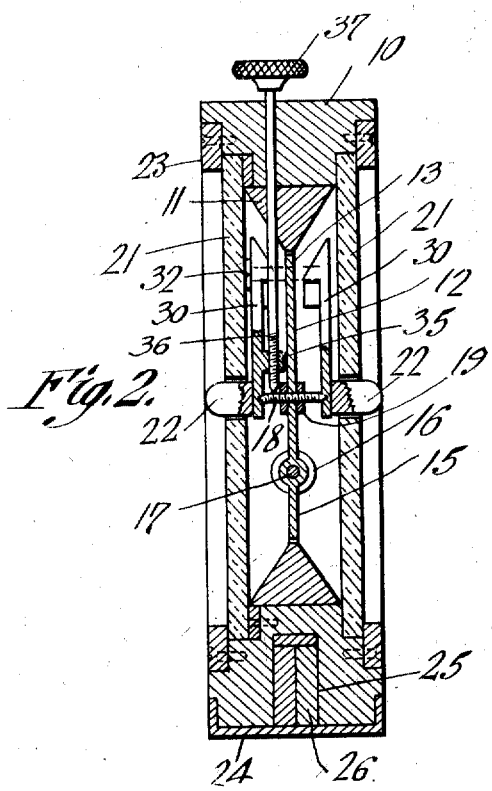

RANSOME B. YOUNG, OF HAZLETON, PENNSYLVANIA.

PLUMB-LEVEL.

1,227,360.  Specification of Letters Patent.  Patented May 22, 1917.

Application filed September 5, 1916. Serial No. 118,546.

*To all whom it may concern:*

Be it known that I, RANSOME B. YOUNG, a citizen of the United States, residing at Hazleton, in the county of Luzerne and State of Pennsylvania, have invented a new and useful Plumb-Level, of which the following is a specification.

The device forming the subject matter of this application is a plumb level, and the present application proposes sundry specific improvements in the plumb level shown in my prior Patent No. 634,657, granted on the 10th day of October, 1899.

The invention aims, specifically, to provide novel means whereby the shaft of the pendulum indicator may be held against movement, and to improve the support on which the pendulum indicator swings.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in side elevation, a portion of a plumb level constructed in accordance with the present invention;

Fig. 2 is a cross section of the plumb level forming the subject matter of this application.

Since the plumb level herein disclosed resembles in many particulars, the plumb level shown in my prior patent, the description in this application will follow the description of the patent above mentioned, notice being given at the proper point where the description of what is new begins.

The numeral 10 designates the stock of the instrument, which is cut away at its center to form an opening for the reception of a scale ring 11 having suitable graduations adapted to be designated by a pendulum indicated at 12 having, preferably, a central upright pointer 13, lateral pointers 14, and a depending pointed weight 15. Carried by this depending weight are adjustable poises 16, mounted upon a transverse pin or rod 17, whereby in case of necessity, any inaccuracy of equilibrium in the indicator may be rectified by the adjustment of the poises. The indicator is arranged, as above stated, within the space bounded by the scale ring 11, of which the side surfaces are preferably beveled to enable the device to be viewed from either side, and the indicator spindle 18, which is secured transversely through the indicator 12 by means of suitable nuts 19, is provided with terminal center points. The numeral 21 indicates a pair of guards or crystals held to the stock 10 by securing rings 23. The stock 10, which is preferably constructed of wood, may be provided along its lower edge with a face plate 24, and mounted in a channel 25, which is closed at its outer side by said face plate, are extension slides 26.

The foregoing elements are shown in patent above enumerated, and the novel portions of the structure, peculiar to this application, will now be set forth.

The invention comprises a pair of V-shaped hangers each including an arm 30 and an arm 31, the upper extremities of the arms 30 and 31 of the hangers being attached, by means of securing elements 32, to the scale ring 11. The indicator spindle 18 is journaled in the lower portions of these hangers. The lower ends of the hangers carry grips 22 which, as in prior patent, are mounted to slide in openings formed in the guards or crystals 21. The grips 22 may be dispensed with if desired. The arm 30 of one hanger has an inwardly projecting lug 35. Into the lug 35 is threaded a screw 36, the inner end of which is adapted to bear on the indicator spindle 18. The screw 36 passes through the scale ring 11 and through the stock 10, and is provided at its outer end with a button 37.

When it is desired to hold the pointer 13 or the pointers 14 temporarily on the graduations of the scale ring 11, then the grips 22 may be pressed toward each other, thus causing the lower ends of the hangers to bear upon the ends of the indicator spindle 18. This operation will be found useful when the device is being manipulated in a dark place.

If desired, and notably when it is expedient to hold the pendulum indicator 12 in place for a considerable period of time, the screw 36 may be rotated by means of the button 37, thus causing the inner end of the screw to bear against the indicator spindle 18.

There is a specific advantage in making the hangers, comprising the arms 30 and 31, of V-shape. The screw 36, it is to be observed, extends along the arm 30, approximately parallel thereto. If the outer end of the screw 36, carrying the button 37, should be struck accidentally, the arm 30 might be distorted, and the position of the pendulum indicated at 12 might be shifted, were it not for the fact that the hanger includes the arm 31 which acts as a brace, and prevents the undesirable consequences above mentioned. The screw 36 is housed for the most part within the contour of the device, and is not likely to be bent or damaged.

Having thus described the invention, what is claimed is:—

In a plumb level, coöperating elements comprising a stock having an opening, and a scale ring in the opening; V-shaped hangers depending from the scale ring and including diverging arms; a pendulum including a shaft mounted to rock in the hangers adjacent the point of juncture of the arms of the hangers; and a set screw threaded into one of said coöperating elements and adapted to bear at its inner end on the shaft, the set screw extending substantially parallel to one arm of one hanger, and the other arm of the same hanger acting as a brace preventing a shifting of the axis of rotation of the shaft, when the screw is moved.

In testimony that I claim the foregoing as my own, I have hereto affixed my signature in the presence of two witnesses.

RANSOME B. YOUNG.

Witnesses:
G. B. M. McHenry,
Charles O. Beck.